United States Patent
Abrams et al.

(10) Patent No.: US 8,499,238 B2
(45) Date of Patent: Jul. 30, 2013

(54) MANIPULATING DESIGN MODELS BY EDITING GENERATED REPORTS

(75) Inventors: Steven R. Abrams, New City, NY (US); Bard Bloom, Yorktown Heights, NY (US); Paul T. Keyser, New York, NY (US); Douglas N. Kimelman, Winnipeg (CA); Eric M. Nelson, Durham, NC (US); Tova Roth, Woodmere, NY (US); Ian Simmonds, Dobbs Ferry, NY (US); Steven Tang, San Jose, CA (US); John M. Vlissides, Mohegan Lake, NY (US); Dru Ann Vlissides, legal representative, Clifton, VA (US)

(73) Assignee: International Business Machines Corporation, Armonk, NY (US)

( * ) Notice: Subject to any disclaimer, the term of this patent is extended or adjusted under 35 U.S.C. 154(b) by 1137 days.

(21) Appl. No.: 11/776,028

(22) Filed: Jul. 11, 2007

(65) Prior Publication Data

US 2009/0019353 A1    Jan. 15, 2009

(51) Int. Cl.
*G06F 17/00* (2006.01)
(52) U.S. Cl.
USPC .......................... 715/255; 715/221; 715/234
(58) Field of Classification Search
USPC .................... 715/221, 222, 223, 234, 255
See application file for complete search history.

(56) References Cited

U.S. PATENT DOCUMENTS

| | | | |
|---|---|---|---|
| 6,343,265 B1 * | 1/2002 | Glebov et al. | 707/999.101 |
| 6,510,458 B1 | 1/2003 | Berstis et al. | |
| 7,464,007 B2 * | 12/2008 | Reitman et al. | 703/2 |
| 2002/0156811 A1 * | 10/2002 | Krupa | 707/513 |
| 2002/0184264 A1 * | 12/2002 | Berg et al. | 707/513 |
| 2003/0028561 A1 * | 2/2003 | Gounares et al. | 707/513 |
| 2003/0179230 A1 * | 9/2003 | Seidman | 345/750 |
| 2003/0217267 A1 | 11/2003 | Kindberg | |
| 2005/0044145 A1 * | 2/2005 | Quinn et al. | 709/205 |
| 2005/0229167 A1 | 10/2005 | Henning et al. | |
| 2005/0235031 A1 | 10/2005 | Schneider et al. | |
| 2005/0259120 A1 | 11/2005 | Mansfield et al. | |
| 2008/0140732 A1 * | 6/2008 | Wilson et al. | 707/201 |

OTHER PUBLICATIONS

Abrams, et al., "Architectural Thinking and Modeling with the Architects' Workbench", IBM Systems Journal, vol. 45, No. 3; pp. 481-500; 2006; and.

Youngs, et al., "A Standard for Architecture Description", IBM Systems Journal, vol. 38, pp. 32-50 (1999).

* cited by examiner

*Primary Examiner* — Chau Nguyen
(74) *Attorney, Agent, or Firm* — Scully, Scott, Murphy & Presser, P.C.; Vazken Alexanian

(57) ABSTRACT

A method and system are disclosed for manipulating a model, where that model represents some or all of a design. The design includes a multitude of design elements, the model includes a multitude of model elements, and each of the design elements is represented by a single model element. The method comprises the steps of generating a suite of documents from the model, each of the documents describing a view of the model; and displaying the documents to a user as a series of forms. The user provides information to the forms to change the documents, and changes to the documents result in both changes to the model and consistent changes across the suite of documents. In the preferred embodiment, the model identifies specific relationships between the elements of the model, and each of the model elements has defined properties.

20 Claims, 8 Drawing Sheets

MANIPULATING DESIGN MODELS BY EDITING GENERATED REPORTS

BACKGROUND OF THE INVENTION

1. Field of the Invention

This invention generally relates to computer-assisted modeling, and more specifically, to a method and system for manipulating models by editing generated reports.

2. Background Art

Creating and documenting formal designs is an important discipline in many fields. Designs are often complex structured artifacts, and a number of complementary but interrelated views of the design are possible.

Historically, the most common approach to creating and maintaining designs has been a document-centric one. A design is comprised of a number of separate documents, each presenting a view of the design, in textual, tabular, and diagrammatic formats. It is created and maintained using standard word processing and diagramming tools. In creating these documents, designers often start from a template, which combines typical document structure and general explanatory content. They enter their design by filling specific design detail into the template, in a way similar to filling in a form.

However, experience suggests that this document-centric approach is highly problematic. Aside from offering only weak support for the creative process, deficiencies of this approach include: the possibility of inconsistency within and among the documents, and the fact that word processors' lack of support for a design's semantics precludes any automated validation or analysis of the design.

More recently, model-centric approaches have been adopted. A design is created and maintained as formal models, either as a single holistic model or as a set of related models. These models are essentially "directed graphs" or "semantic networks", manipulated using modeling tools [AWB, RSA, TeleLogic EA tool]. Documents, which present the design in a form more accessible to a wider range of stakeholders, are then automatically generated from the model using report generators. This has proved to be highly effective and a significant advance.

However, some participants in the design process are not facile with direct manipulation of explicit models; they are more comfortable with conventional document preparation. Their interaction with the design needs to be in terms of the generated documents. They view the documents, think in those terms, and formulate comments and changes to the design as comments and changes to the document.

SUMMARY OF THE INVENTION

An object of this invention is to improve computer-assisted modeling.

Another object of the present invention is to provide a document-based interface for constructing and manipulating models.

A further object of the invention is to provide a document-centric interface, for constructing and manipulating models, without losing the power and benefit of a model-based tool.

These and other objectives are attained with a method and system for manipulating a model, where that model represents some or all of a design. The design includes a multitude of design elements, the model includes a multitude of model elements, and each of the design elements is represented by a single model element. The method comprises the steps of generating a suite of documents from the model, each of the documents describing a view of the model; and displaying the documents to a user as a series of form-like documents. The user provides information to the forms to change the documents, and changes to the documents result in both changes to the model and consistent changes across the suite of documents.

In the preferred embodiment, the model identifies specific relationships between the elements of the model, and each of the model elements has defined properties. Also, in this preferred embodiment, at least some of the documents include first and second types of text, the first type of text is retrieved from the properties of the model elements, and the second type of text is reproduced verbatim from a template. Henceforth, we refer to the first type of text as "model text" and to the second type of text as "template text". In addition, preferably, the step of providing information includes the step of the user editing the first type of text in the documents; and said editing resulting in a change to one of the properties of the model elements, and leading to the refreshing of said one property wherever said one property is repeated in all of the documents.

Further, in this preferred embodiment, the structure of the document—its sections and subsections and lists of items—are determined by the structure of the model—its nodes and relations. In addition, preferably, the step of providing information to the document includes the steps of altering structure by adding or deleting substructure (either by direct editing or by operations selected from pop-up menus); and said alteration resulting in a change to the corresponding model structure—creation and deletion of nodes and relations—leading to the refreshing of said content wherever it appears in all of the documents.

The preferred embodiment of the invention, referred to as "Modeling By Forms," or MBF, is a document-based interface for constructing and manipulating models. MBF blends the best of the previous approaches. With this approach, users manipulate a document-like representation of some view of the model. This document-like representation is form-based in the sense that it has fields to be filled in, or altered, by the user. Textual constructs of the form include lists and tables, and placeholders can be used to indicate areas in which users can enter and manipulate content. All changes to this representation are automatically reflected back into an underlying model. Further, as the underlying model evolves, all other document-like views of the model are updated. Thus, the document-like views are not simply static reports, as in the past, but rather they are "live" representations that can be dynamically manipulated. It is important to note that these two "modes" of interacting with the design—model-centric and document-centric—are complementary, and at any given time users can choose whichever mode is most comfortable for them and most effective for the task at hand.

Further benefits and advantages of this invention will become apparent from a consideration of the following detailed description, given with reference to the accompanying drawings, which specify and show preferred embodiments of the invention.

DETAILED DESCRIPTION OF THE PREFERRED EMBODIMENTS

In creating solution designs, one approach is the "Global Services Method" used by the International Business Machines Corporation (IBM). This method defines how consultants perform solution design, and it incorporates a mixture of Work Product Definitions and Technique Papers. Work Product Definitions specify kinds of documents that are produced in a consulting engagement, stating why those documents are useful, the pitfalls of not producing them, and suggesting ways of presenting the results. Technique Papers describe formal and informal processes by which the content of work products is developed, and is a basis for "How To" training.

In the case of a solution design, GS Method suggests that architects produce a number of interrelated work products. These include: the System Context, in which the system being developed is shown as a black box exchanging information with external system and human actors; the Architecture Overview Diagram, which sketches the solution design at a high level, drawing elements such actors, subsystems, components, locations, servers, and network connections, from across the design, for purposes of communicating key concepts to various external stakehoders and sponsors; the Use Case Model, which documents architecturally significant use cases that drive the solution design and corresponding non-functional requirements (i.e., requirements that pertain to system qualities or constraints, such as performance, availability, security, and standards compliance); the Component Model, which documents the static and dynamic properties of software components; the Operational Model, which shows the infrastructure of the solution, and the deployment of software components onto the hardware topology; and the Architectural Decisions work product, which records the rationale for the architecture—alternatives that were considered, and decisions that ultimately were made.

Figure 1:
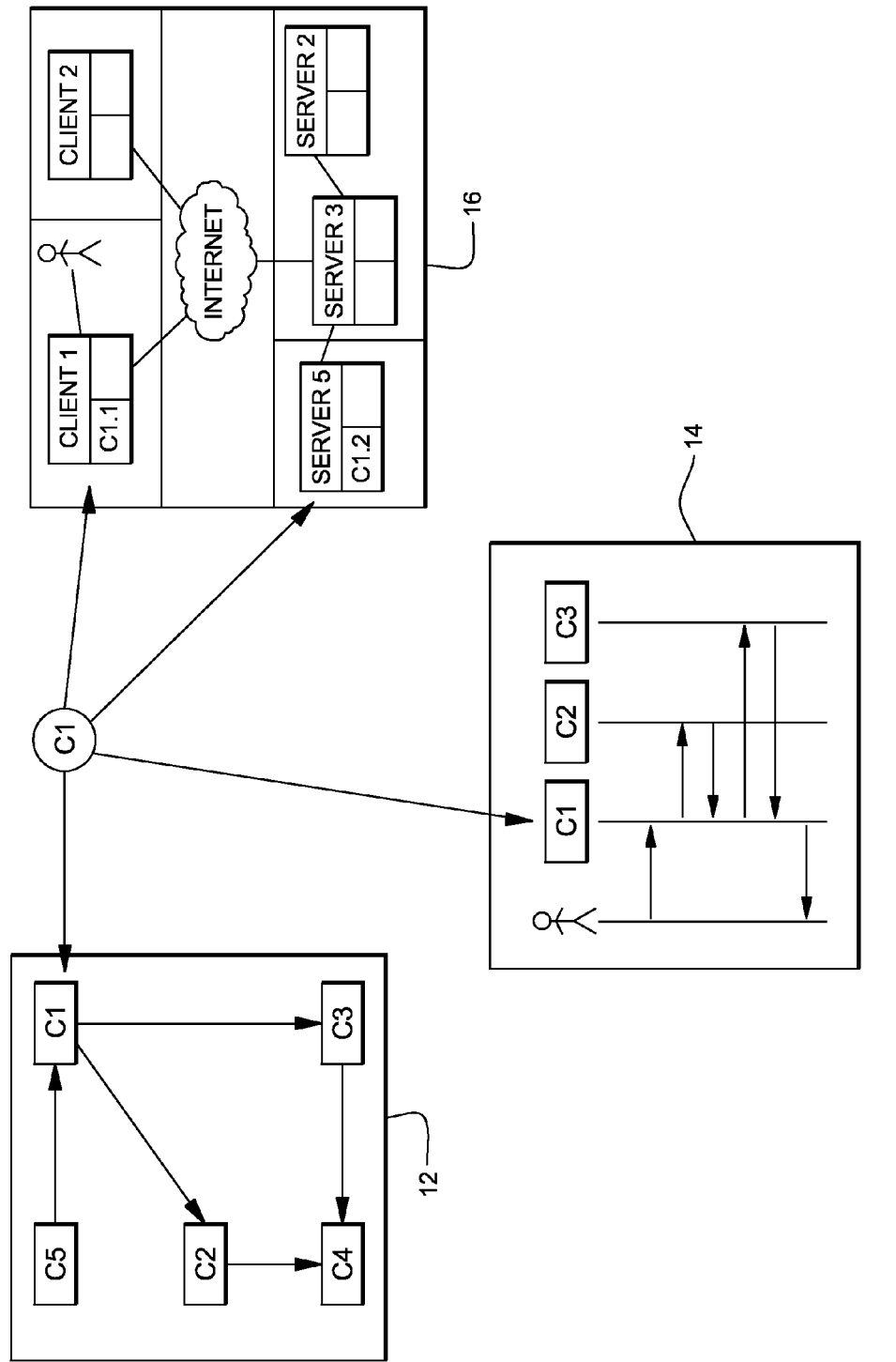
FIG. 1 illustrates a single solution element playing a role in several work products.

These work product documents must be consistent, not only within themselves, but also with respect to each other. FIG. 1 highlights the challenge of maintaining consistency for a single element of the solution design. It shows three facets of a functional component called C1: on the left at 12, its static dependencies on components C2 and C3, and the dependency of C5 upon it; in the center at 14, a specific collaboration is shown between C1, a user of the system, and components C2 and C3; and on the right at 16, its deployment as two distinct deployment units residing on machines Client 1 and Server 5. These facets are captured in distinct documents, and need to be kept consistent.

A number of tools may be used to help maintain consistency within and between the documents. One such tool is the Architects' Workbench (AWB), which is a tool for use by Information Technology (IT) Architects in the IBM Global Business Services and the IBM Global Technology Services. Prior to AWB, maintaining the necessary document consistency was very difficult. This entire set of interrelated documents often was created and maintained using standard office applications: word processors and presentation or diagramming tools. In some cases, architects may have created certain technical diagrams using a dedicated UML tool, but support for consistency across a set of work products was still lacking.

The first version of AWB solved this problem by representing an entire design as a single comprehensive "holistic" model, with each element of the design being represented by just a single model element, which might be referred to from many places in the model. Work products were then generated from the model as reports. As such, for example, if component C1 of FIG. 1 was renamed as C7, this change would then be reflected uniformly throughout all generated work products and across the user interface.

A great advantage of generating work products from a model is this guarantee of consistency. And a benefit of having a tool that focuses on explicit model manipulation is powerful high-level operations such as effective support for sophisticated refactoring (which, for example, is invaluable in deriving reference architectures by consolidating and generalizing a number of specific solution design instances).

While early users found AWB powerful and useful, they nevertheless struggled with the gap between the model-based interface and the output. They would ask "I see a place for text to appear in the generated document, but where do I enter it in the UI?" and "I entered text in this field of an editor, but why did it not appear in the work product?" What they saw was not what they got.

More importantly, unlike many of the early adopters of AWB, the majority of IT architects do not have computer science backgrounds but, rather, "IT" or business background. To them a "graph" is what shows the value of their stock portfolio over time, as opposed to a mathematical construct consisting of nodes and edges. Explicit manipulation of a model is foreign to these users.

Ultimately the more familiar way to deal with a design is in the form of a set of documents. The present invention provides a document-centric interface, but without losing the power and benefit of a model-based tool.

At a highest level, MBF is a user interface for tools, such as AWB, in which users edit forms—the different work products of GS Method—and, as they do so, changes to the documents result in both changes to the model and consistent changes across the suite of documents. In other words, the user continues to edit a model but through an interface that looks like a series of forms.

Figure 2:
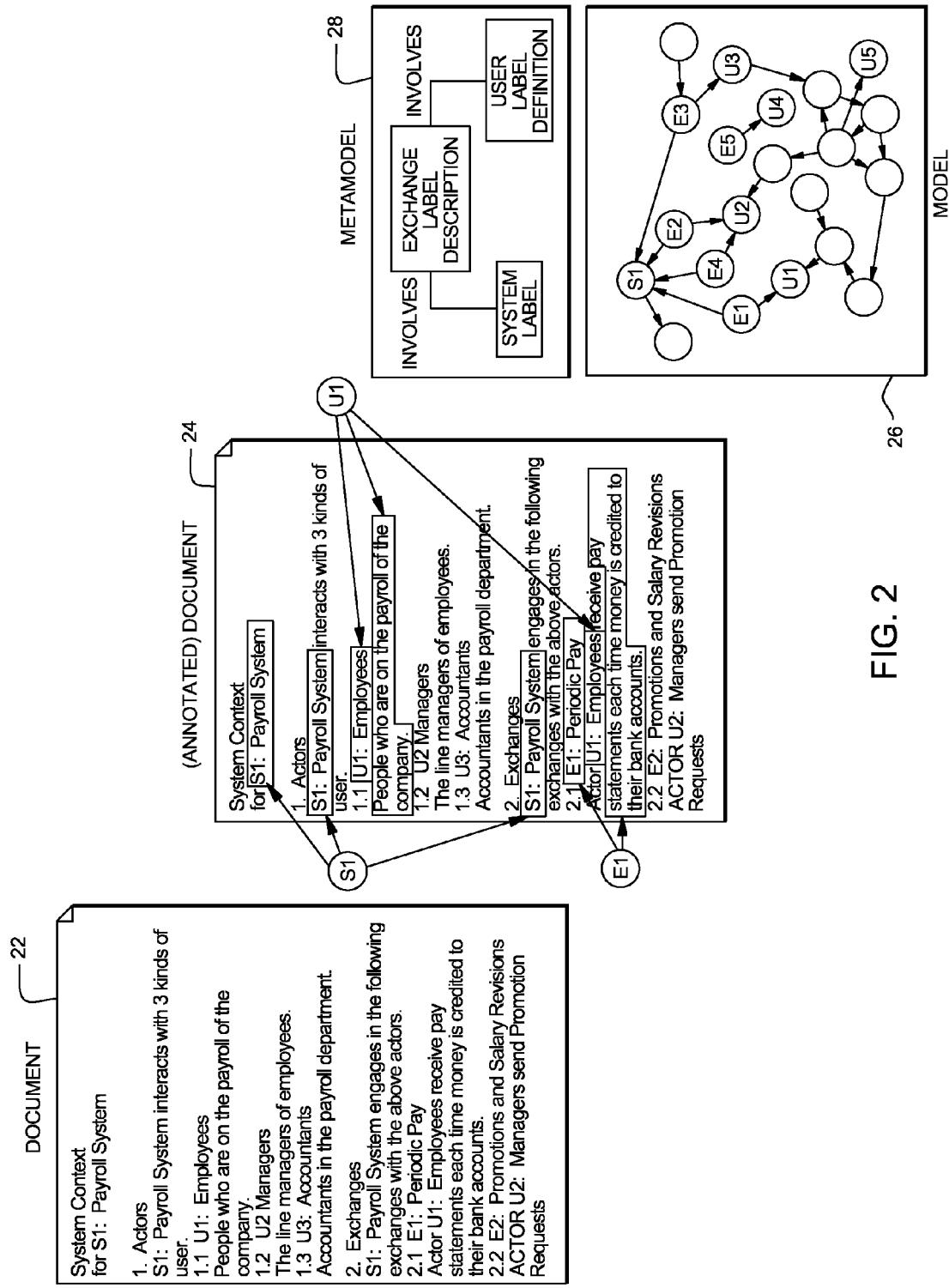
FIG. 2 shows a coupling of a document and a model.

FIG. 2 shows the coupling of a document and a model that follows from MBF. FIG. 2 shows a small section of a simplified System Context Work Product, specifically a document 22 and an annotated document 24, and corresponding portions of an AWB model 26 and metamodel 28 for a system called "S1: Payroll System."

The fragment of document 22 has a title, a Section 1 defining Actors, and a Section 2, which defines each Exchange separately and in more detail. Subsections of sections 1 and 2 respectively give more details about each Actor and Exchange. The fragment of model 26 shows model entities and their relations, including the entities and relations mentioned in the document. This model conforms to a metamodel 28, which dictates that Systems are involved in Exchanges that involve Users.

The central diagram 24 shows the blending of two kinds of text: "model text" shown in the figure as italic text, some of it surrounded by boxes, is retrieved from the properties of the model entities to the right, while "template text" shown in the figure as non-italic text is boilerplate text that is reproduced verbatim from a template. Note that in the UI, other means may instead be used to distinguish the various kinds of text e.g. coloring text blue. In this case, the label "S1: Payroll System" is repeated three times, while that of U1 is repeated twice, and UI's definition appears just once. The structure of the document—its sections and subsections and lists of items—is determined by the structure of the model—its nodes and relations. The selection of Exchanges and Users to include in the document is determined by direct or indirect relationships to S1. Exchanges E1 and E2 are included due to their Involves relations to S1, as are E3 and E4 (not shown in the middle diagram 24). However, E5 is excluded, as it has no such relation to S1. Similarly, U1, U2 and U3 are included since, unlike U4 and U5, they are involved in exchanges that involve S1.

In order for documents to be perceived as being backed by a model, editing operations must have a full and immediate semantic effect. For example, simple textual editing of model text should result in a change to a property of a model element, and lead to the refreshing of that property wherever it is repeated in the document. If "S1: Payroll System" was relabeled as "S1: Advanced Payroll System" the updated value would be displayed in three places.

Figure 3:
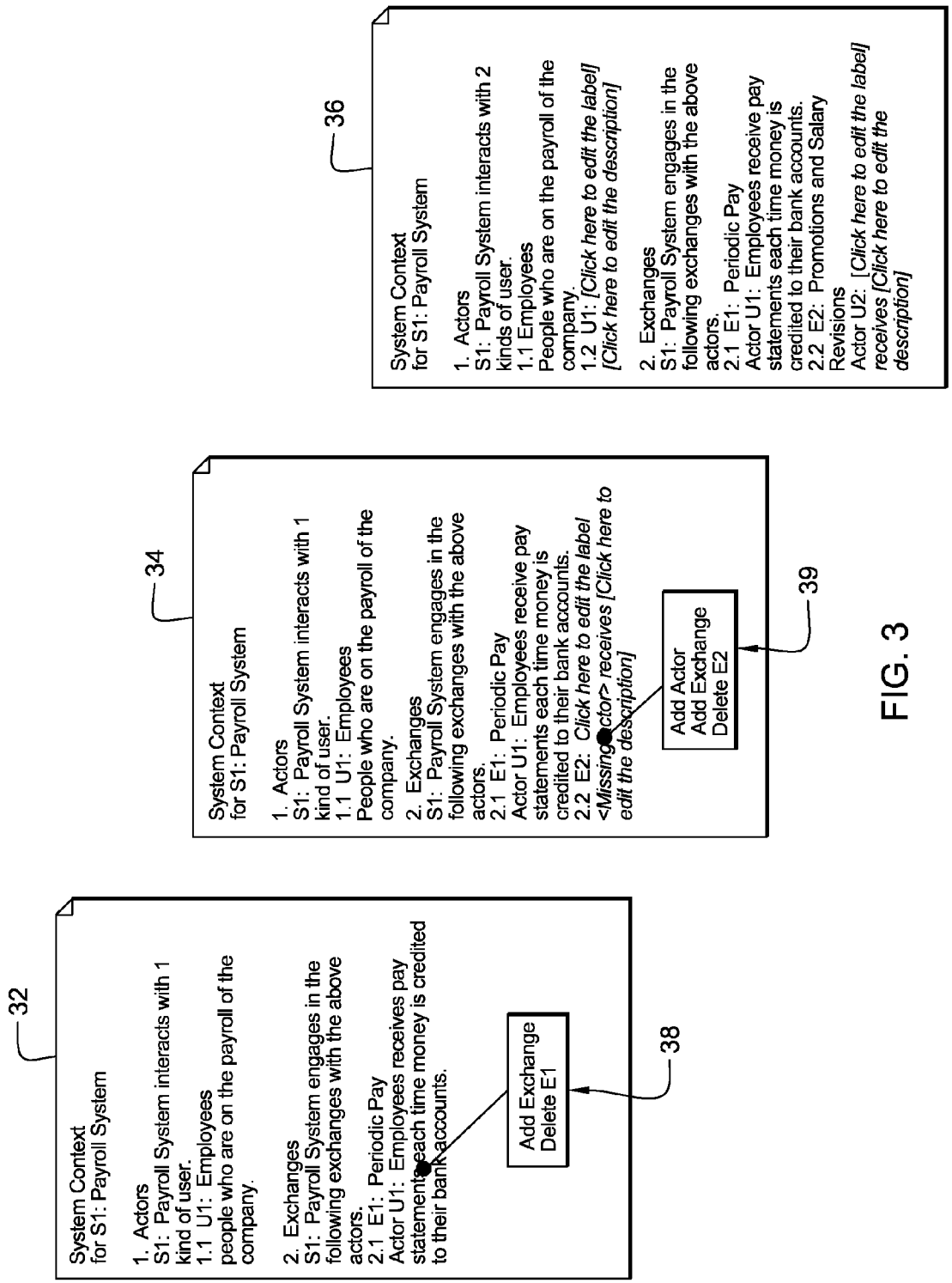
FIG. 3 illustrates several states of a document.

FIG. 3 shows several earlier states of the document. In the leftmost state 32, the system is involved in the single exchange E1 with the single user U1. From a pop-up menu 38 associated with section 2, the user asks to add a new exchange, resulting in section 2.2 (in state 34), which contains several pieces of guidance for the user. They see two pieces of "placeholder text", shown in the figure as italic text surrounded by square brackets, that direct them to supply a label and a description of the exchange, and they see "reminder text", shown in the figure as italic text surrounded by angle brackets, that indicates that at the present time there is no Actor involved in the exchange. After supplying a label "Promotions and Salary Revisions" for the new exchange the user asks to Add Actor from a pop up menu 39 associated with the reminder "<Missing Actor>" resulting (in state 36) in placeholders such as "[Click to edit label]" in subsection 2.2, and a new subsection 1.2 in the Actors section. This is consistent with the AWB principal of not imposing rigid modeling workflow on the architect, of allowing the architect to move freely about the model, making changes at will so that there is as little loss as possible of ideas and train of thought, and then providing reminders to help pull together all the ensuing loose ends.

The MBF experience is therefore one of documents with visually distinguished editable text and fixed boilerplate text together with contextual pop-up menus that allow elements and relationships to be created or deleted. Localized edits result in immediate consistent changes throughout the displayed document, whether that means many small changes to labels, or the appearance or removal of entire sections. Newly created blank fields or empty lists are marked to indicate their presence and suggest how the user may add further content.

The user experience outlined above deliberately localizes changes and even text selections to avoid what we call the general inversion problem—that is, determining the impact upon the model of arbitrary user-initiated textual and structural changes to the document. Examples of such changes include direct editing to insert or delete (sub)sections and list items.

Figure 4:
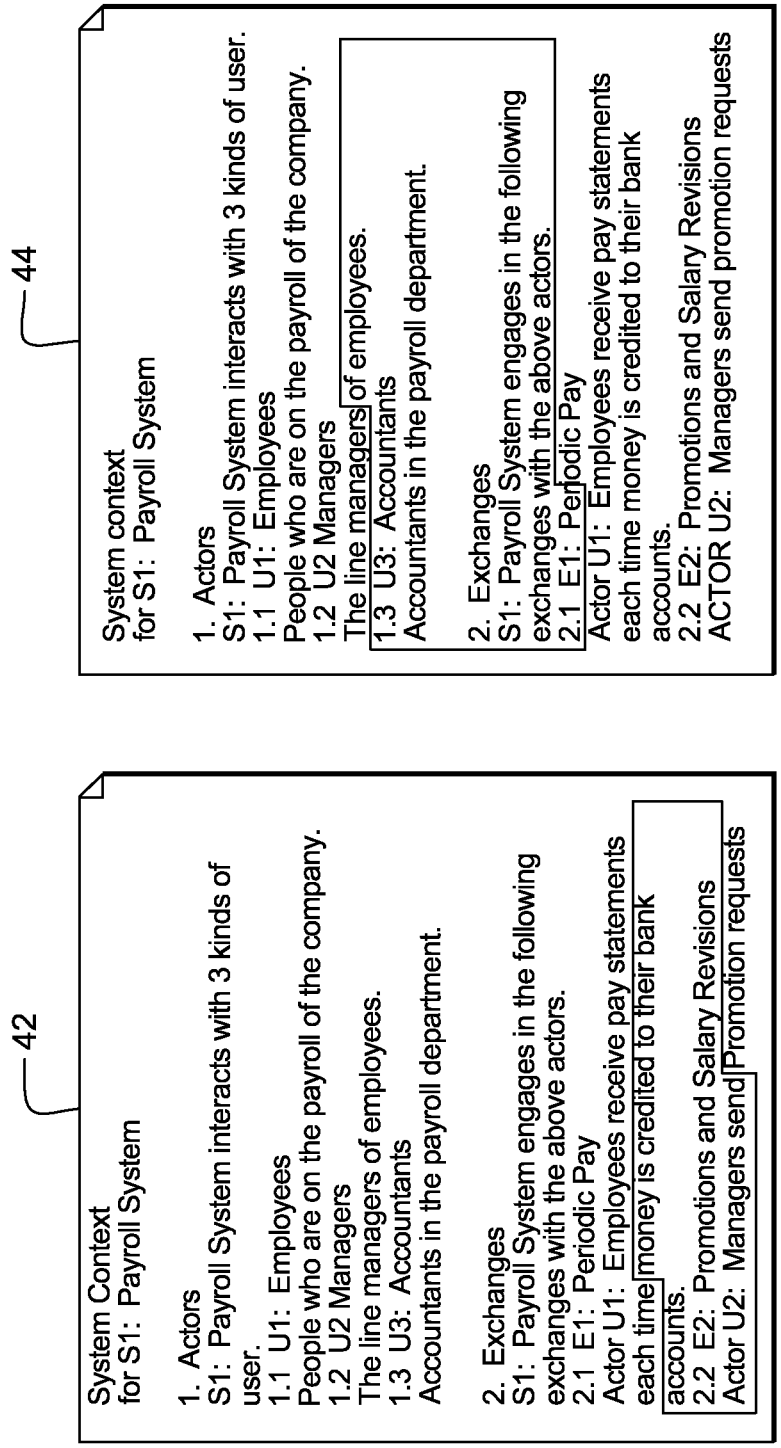
FIG. 4 depicts two states of the document of FIG. 3 and illustrates the difficulties of interpreting arbitrary textual changes.

FIG. 4 shows the difficulties of interpreting arbitrary textual changes. Both documents 42 and 44 shown in FIG. 4 involve text deletions whose semantics are difficult to interpret. The selection on the left includes part of the textual descriptions of two exchanges, the heading of a section that was included because E2 involves S1, and a mention of user U2 due to its involvement in E2. How should AWB respond when this selection is deleted? Should it merge E1 and E2 into a single exchange labeled "E1: Periodic Pay," and combine the textual descriptions in a manner consistent with the expectations of a user familiar with word processing? What should happen to user U2, buried in the middle of this text selection? Should it be deleted, added as an actor involved in the new, merged E1, or remain in the model disconnected from E1 and the deleted E2?

The example on the right of FIG. 4 is even more problematic. It suggests not only the removal of the heading for section 2, but also the conceptual merging of a list of exchanges into a list of actors. At a more detailed level it suggests the merging of user U2 and exchange E1.

These broad textual edits offer a glimpse of the broad variety of ambiguous and unanticipated interpretations that could be made, and explain why text selections in this preferred embodiment of MBF are confined to contiguous characters within a single block of model text. This prevents users from asking to delete across and/or combine values from different properties, or even from different model entities. As will be understood by those of ordinary skill in the art, MBF may be extended to allow multi-selection, and to extend selections by a meaningful chunk at a time, always encompassing a well-defined part of the model.

In this preferred embodiment of MBF, structural changes are confined to operations provided through pop-up menus, the semantics of which can be carefully labeled and controlled, and some of which are easy to imagine. An example of this is the operation "Add [an] Exchange" (mentioned above) which is available throughout section 2 in FIG. 3. Subsections of section 2 appear if and only if they correspond to an exchange that involves system S1. It is readily apparent that "Add Exchange" must create a new Exchange together with an involves relation between it and S1. MBF may also be extended to remove this confinement, allowing structural changes to be made by adding elements to bulleted or comma-separated lists, and interpreting those as the kinds of structural operations discussed above.

Other operations are less evident, such as one to "Add [an] Actor" to section 1. An actor should appear here only when it is involved in an exchange that also involves S1. One sensible operation would add a new Exchange as well as a new Actor. There are other choices: for example, adding a new Exchange to an existing Actor, or an existing Exchange to a new Actor. Alternatively, we could introduce a new kind of relation between Systems and Actors, perhaps called should_interact_with, and remind the user to turn these relations into proper System-Exchange-Actor ensembles at their later convenience.

In response to these considerations, the basic user experience in this preferred embodiment of MBF is deliberately more constrained than the free form use of a word processor, confined to localized text edits within editable text (e.g. model text, placeholder text, and reminder text) and operations made available through pop-up menus.

In another embodiment of MBF, a tool like AWB indeed allows a user to make arbitrary textual changes by means of common word processing editing action sequences. The tool responds as expected to unambiguous actions that have only a single interpretation with respect to model alteration. Examples of unambiguous actions include: textual deletion of exactly a single subsection or list item, or insertion of a single new section or list item. In the case of ambiguous actions that have multiple possible interpretations, the tool prompts the user to select one of the possible interpretations. When the user selects one, that change is reflected in the model, and the document is then restored to a state that reflects the resulting updated state of the model.

In yet another embodiment of MBF, the tool allows a user to make an arbitrary text selection, and the pop-up menu for that selection includes an operation that opens a graph editor, similar to MindManager, on the part of the model that gave rise to the selected text.

AWB is built upon the open-source Eclipse platform. AWB supports both document generation and MBF by means of a common report generator component, together with the layout and editing capabilities of HTML-based browsers.

Figure 5:
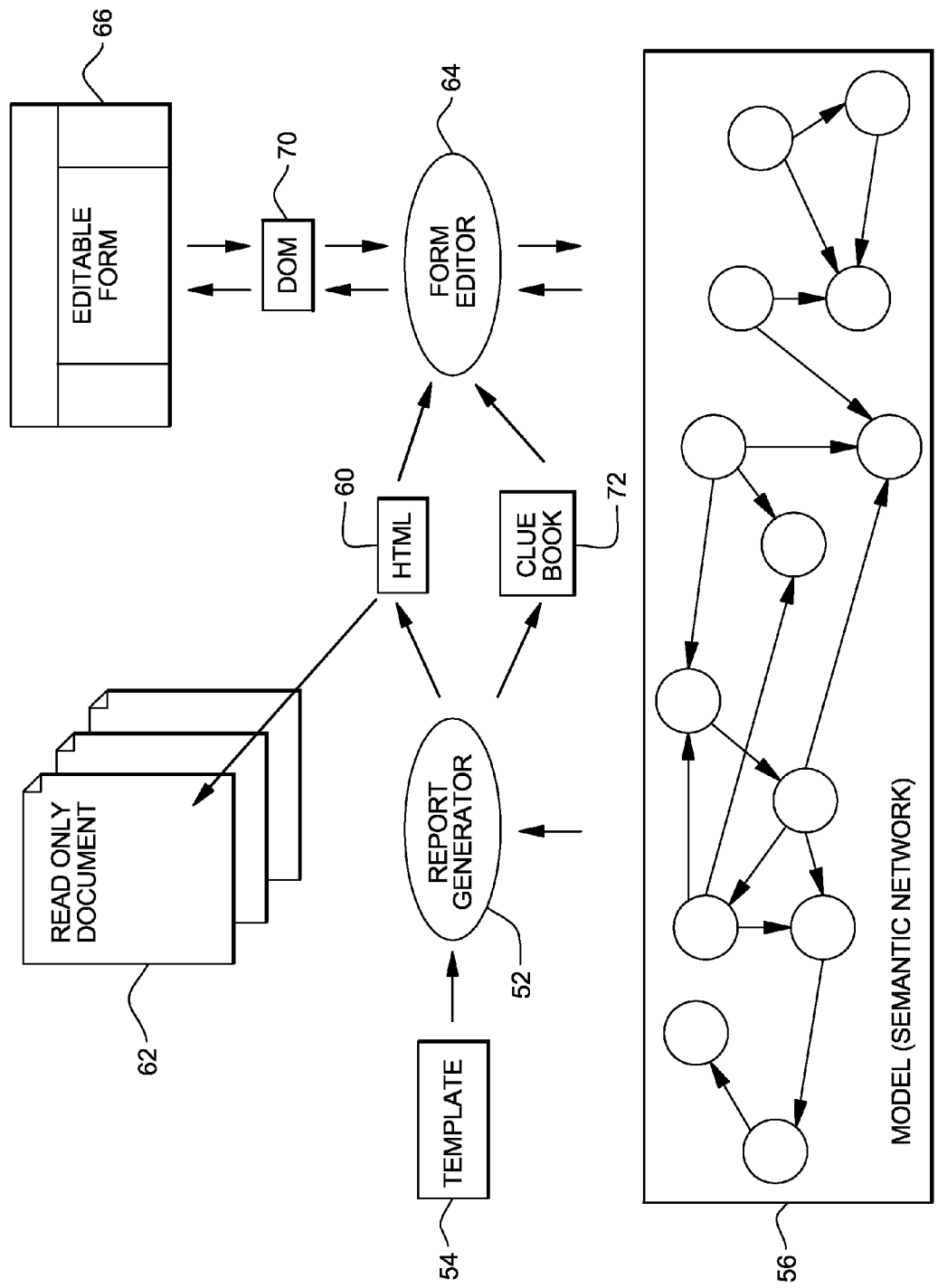
FIG. 5 illustrates the technology of modeling by forms.

FIG. 5 illustrates the technology of Modeling By Forms. The Report Generator 52 processes a template (or "Structure Definition") 54, which tells the Report Generator how to collect document content from the model 56, and which HTML tags to include to correctly lay out the content as an HTML document. The resulting HTML can be displayed either "as-is" in read-only form 62 or, after suitable processing by the Form Editor 64, as an Editable Form 66. Read-only documents can be displayed in any browser while Editable Forms are displayed by a browser plugin for Eclipse. The browser plugin displays and allows editing of HTML documents, and exposes HTML documents to Java in the form of a Document Object Model (DOM) 70.

In addition to generating a normal HTML document, the Report Generator produces a complementary Java "clue book" 72. The clue book provides a mapping from short strings ("c1", "c2", . . . ) to objects in the running Java image. The HTML includes not only the content and layout of the document, but the string identifiers of clues in the clue book. These string identifiers are contained in HTML tag attributes that do not affect content and layout of the displayed page, and hence can be regarded as "hidden information". The hidden information and clues allow the Form Modifier to selectively enable the browser plugin's edit and callback capabilities. They allow the Form Modifier to relate the text fields of the form back to the model, enable contextual pop-up menus for adding or deleting model entities and relationships, and refresh the document in response to model change events.

Figure 6:
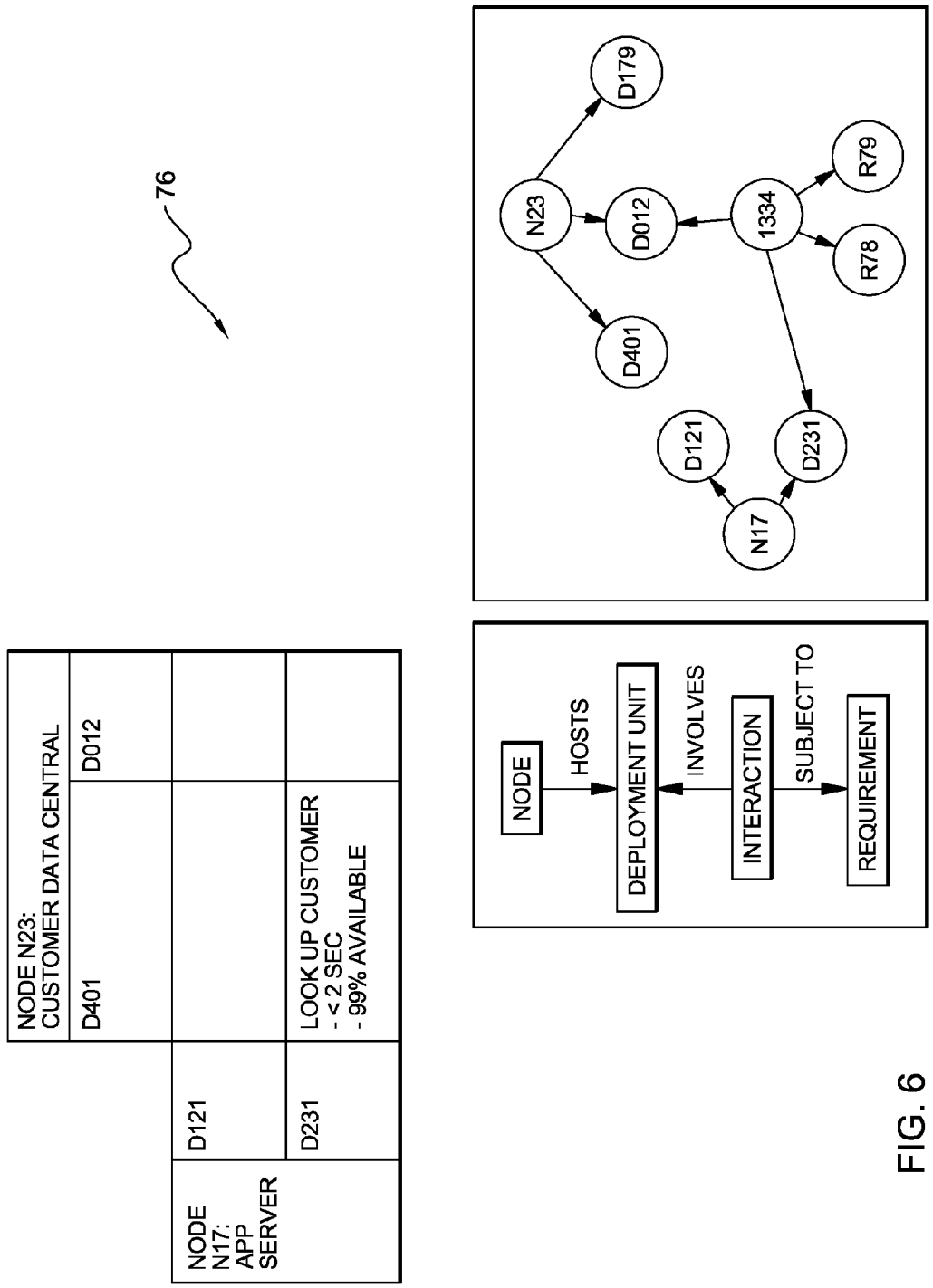
FIG. 6 shows a table from a form and its representation in the model along with relevant excerpts of the metamodel.

FIG. 6 shows a table 76 from an operational model work product. It shows interactions between software and data deployment units (with labels like Dxxx) hosted by a client node (N17: App Server) and server node (N23: Customer Data Central), and the requirements that each interaction is subject to. D231 on the application server ought to be able to "Look up customer" information in D401 in under 2 seconds, and count on being able to do that 99% of the time. None of the other client/server deployment unit pairs have interactions yet.

The editability of each piece of editable text (e.g. model text, placeholder text, and reminder text) relies on markup, referred to above as "hidden information", in the generated HTML document and a corresponding entry in the clue book. For example, within the document's HTML, the value "Look up customer" is wrapped as follows:
<span id="awbedit" kind="property" clue="CP378"> Look up customer </span>

Each time the HTML is displayed, the Form Modifier walks the DOM looking for <span/> tags whose identifier is awbedit and acts upon the associated clues. An awbedit span of kind="property" indicates a text field whose value is the value of some property of the same node. The corresponding property clue CP378 refers to a Java clue book object, which indicates which property ("label") of which model object (the node with ID "I334") is being displayed. The form modifier duly sets a style parameter of the span to distinguish the text in the UI as discussed above, adds an attribute contenteditable="true" to inform the browser to permit editing of the enclosed content, and associates callbacks with the various actions that the browser plugin enables on editable content. When the user makes a change to the content, the form modifier consults clue CP378 to learn in which property ("label") of which node ("I334") to store the new value. The change to the attribute value then leads to a cascade of notifications within AWB, causing the new value to be correctly refreshed wherever it is displayed, both within the document and in the rest of AWB's user interface, including other documents, hierarchical textual views of part of the model, and graphical diagrams of parts of the model, as well as other kinds of views of the model.

Figure 7:
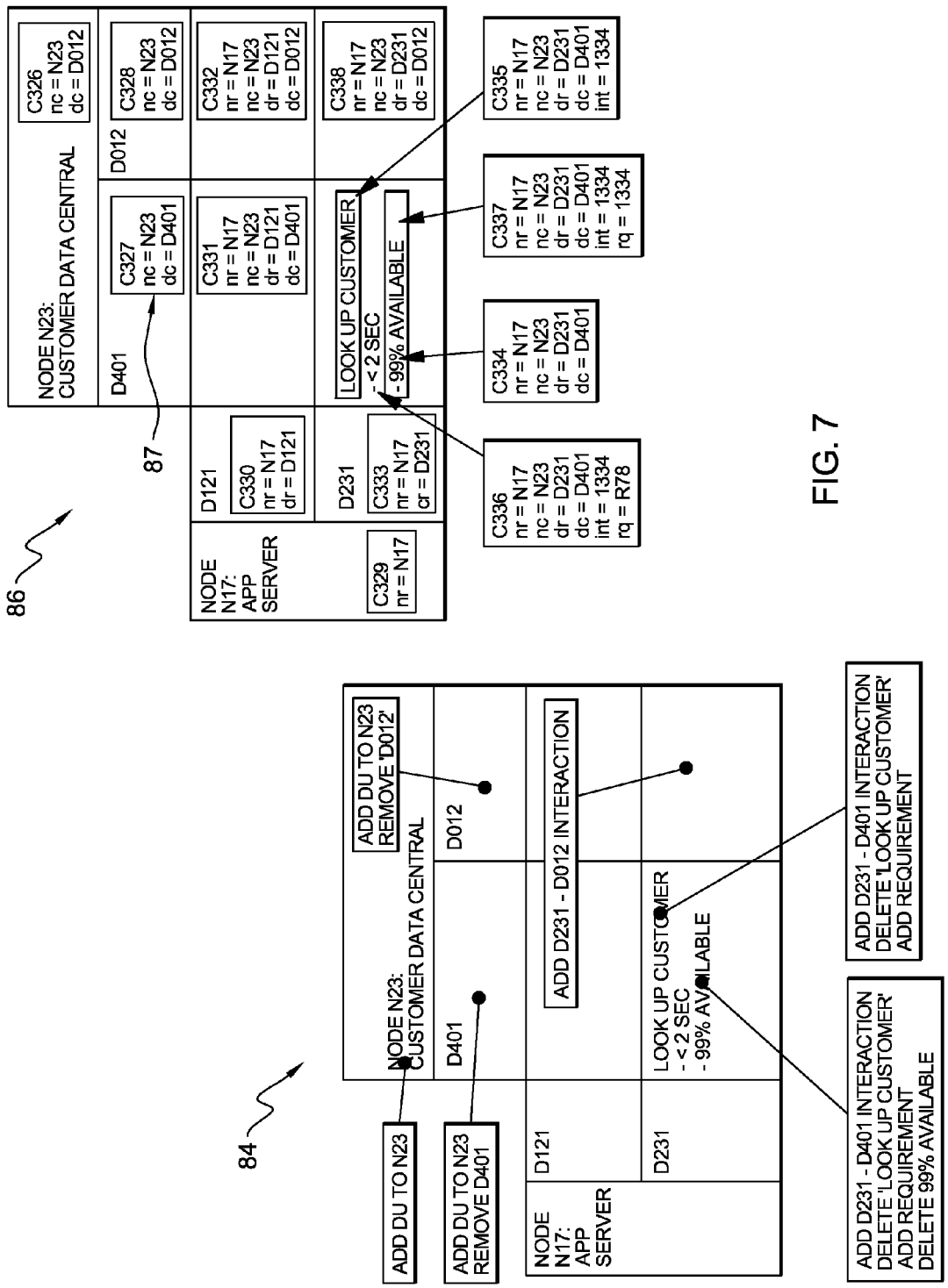
FIG. 7 shows contextual menus and behind-the-scenes clues of the table in FIG. 6.

Markup in the HTML and corresponding clues allow the Form Modifier to provide content for pop-up menus, as shown in FIG. 7, at various places in the table and the rest of the document.

Examples of menus to be enabled are shown at 84 on the left side of FIG. 7, while a subset of the clue book content is shown at 86 on the right side of FIG. 7 as decorations of the table's cells. An operation to add columns ('Add DU to N23') is available in the pop-up menus of the cells of the table's two heading rows, while column removal operations ('Remove D401', 'Remove D012') are confined to the heading cells of those columns ('D401', 'D012' respectively). In the case of the table cell labeled 'D401', these operations are enabled by the following HTML tags in the generated document:

```
<span id="awbedit" kind="command" label="Add DU to N23"
clue="CC72">
  <span id="awbedit" kind="command" label="Remove 'D401'"
  clue="CC73">
    <td>
      <span id="awbedit" clue="CP498"> D401 </span>
    </td>
  </span>
</span>
```

When the user right clicks in the background of this cell, the popup menu shown on the left is assembled by walking the DOM from the cell's node toward the root of the tree collecting all containing command nodes. When the user selects a menu entry—say, "Add DU to N23"—two clues are retrieved: the command's clue, CC72, and a state clue (C327) 87 associated with the clicked upon cell ("D401"). The state clue supplies values for the variables nc (Node whose Columns are shown, with value N23) and dc (DU shown in this Column, with value D401), and an operation provided by the command clue is evaluated with these values.

Separating the concern of identifying regions that are editable or the locus of commands—captured in HTML—from the concern of command definition and detailed state data—stored in a Java clue book—appears to optimally balance space and performance. It allows a single generator to be used for both work products and structure definitions, without bloating the HTML with vast quantities of state information.

AWB forms and reports (work products) are specified using an XML-based language together with a complementary query language. Thus XML and HTML are not only part of the mechanism of MBF, but also part of the means by which forms and documents are specified.

A form or structure definition is a program expressed in XML, which combines familiar HTML markup with additional AWB programming tags that enable loops, conditionals, variables, procedures and simple modularity. These programs walk and query the model and, as they do so, write out HTML including any markup that is included in the program itself.

The following example generates a somewhat simplified version of the document shown in FIGS. 2, 3 and 4, consisting of their titles and second section. It illustrates many of the basic features of the language and the way that these are intermixed with HTML tags, fixed text and queries. Line numbers have been added for the convenience of this explanation.

```
1     <title> System Context for <label/> </title>
2     <h1> Exchanges </h1>
3     <for nodes="focus.@involves~*exchange.sortedBy(it.label)"
      var="exch">
4        <if-none>
5           <label/> is involved in no exchanges.
5        </if-none>
7        <if-some>
8           <focus-on var="exch"> <label/> </focus-on> engages in the
following exchanges with the above actors.
9              <each>
10                <h2><label/></h2>
11                <p>
12                   <for-related-nodes relation="involves@" types="user">
13                      <if-none>
14                         <em>A missing actor</em>
15                      </if-none>
16                      <if-one>
17                         Actor <label/>
18                      </if-one>
19                      <if-some>
20                         Actors
21                         <each>
22                            <label/>
23                         </each>
24                         <between>,</between>
25                         <between-last> and </between-last>
26                      </if-some>
27                   </for-related-nodes>
28                   <_description_/>
29                </p>
30             </each>
31        </if-some>
32     </for>
```

While line 2 is straightforward HTML, line 1 makes use of the AWB <label/> tag.

Missing from the above are any explicit commands. While it has already been shown how <span/>s and clues generated for simple properties are sufficient to enable editing behaviors, the definition of commands to add and delete exchanges for this system requires further explanation and definition. With the list of exchanges determined by a query, as on line 3, the Form Modifier would have to infer an inversion of the query in the form of operations to add or remove model entities from its results set.

AWB offers two means for declaring commands: explicit and implicit. Explicitly the form definer could add an "Add exchange" operation by wrapping the <for> loop of lines 3 thru 32 with a <command> tag as follows:

```
2.9    <command name="Add exchange" when="true" do="...
'exchange'.createNode('New Exchange 1')...">
3         <for nodes="focus.@involves~*exchange.sortedBy(it.label)"
          var="exch">
...
32        </for>
33     </command>
```

This causes the "add" command to be added to the popup of every span generated within the loop. The name attribute of the tag determines the label of the command in the generated popup menu, the when attribute is a Boolean-valued query determining when to enable the command, and the do attribute contains a query that performs the command. Note that the part of the command that creates a relation to the newly created node has been elided.

In addition to explicit commands, the report language supports higher-level constructs that implicitly add commands that recur in common situations. In this particular example, the <for> loop of lines 3 thru 32 would be better written using a <for-related-nodes> tag like this:

```
3      <for-related-nodes relation="@involves" types="exchange"
3.1         sorted-by="it.label" var="exch">
...
32     </for-related-nodes>
```

The key parameters enabling add and remove operations have been factored out, namely, the type(s) of nodes that can be created by add operations, and the type of relations to be created in add operations and deleted in remove operations.

While higher level constructs work in a great many common situations, other cases—such as for section 1 of FIGS. 2, 3 and 4—fall outside the 80-20 and must be handled by explicit commands. The contents of section 1 are determined by a more complex query, with actors being listed as a byproduct of their involvement in an exchange with the system, S1, and explicit commands must be used.

The method of the present invention will be generally implemented by a computer executing a sequence of program instructions for carrying out the steps of the method and may be embodied in a computer program product comprising media storing the program instructions. For example, FIG. 8 and the following discussion provide a brief general description of a suitable computing environment in which the invention may be implemented. It should be understood, however, that handheld, portable, and other computing devices of all kinds are contemplated for use in connection with the present invention. While a general-purpose computer is described below, this is but one example, the present invention may be implemented in an environment of networked hosted services in which very little or minimal client resources are implicated, e.g., a networked environment in which the client device serves merely as a browser or interface to the World Wide Web.

Although not required, the invention can be implemented via an application-programming interface (API), for use by a developer, and/or included within the network browsing software, which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

Figure 8:
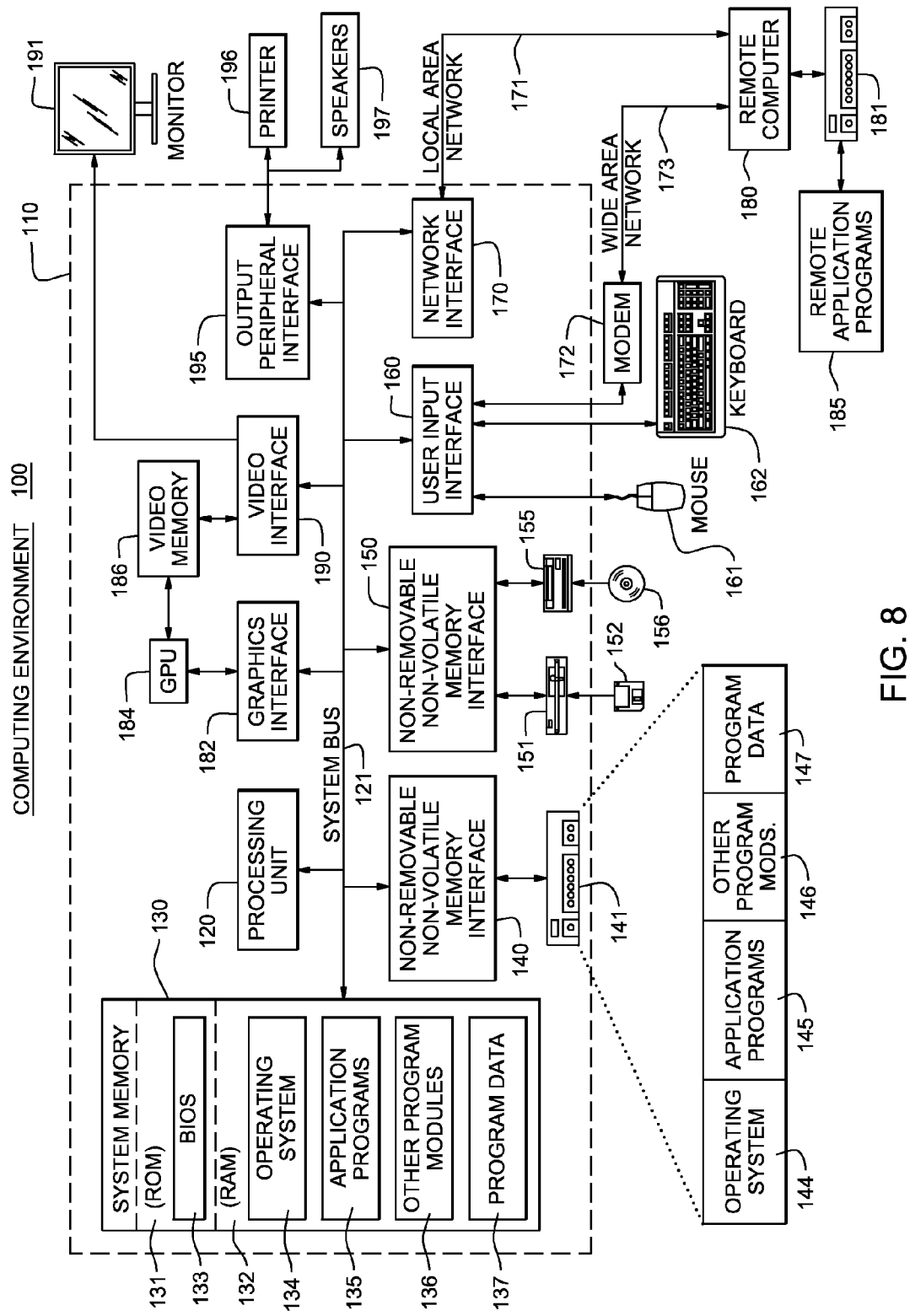
FIG. 8 is a block diagram of a computer system that may be used in the practice of the present invention.

FIG. 8, thus, illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 8, an exemplary system for implementing the invention includes a general purpose-computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 4 illustrates operating system 134, application programs 135, other program modules 136, and program data 137.

The computer 110 may also include other removable/non-removable, volatile/nonvolatile computer storage media. By way of example only, FIG. 8 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 4 provide storage of computer readable instructions, data structures, program modules and other data for the computer 110. In FIG. 8, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host-processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of co-processing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 4. The logical connections depicted in FIG. 4 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 4 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

As will be readily apparent to those skilled in the art, the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

The present invention, or aspects of the invention, can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of using visually displayed forms to make changes in a model for a design, said method comprising the steps of:
   using a model to represent some or all of the design, the design including a multitude of design elements, the model including a multitude of model elements, each of the model elements having defined properties, and each of the design elements being represented by a single one of the model elements;
   generating a suite of documents from the model, each of the documents describing a different aspect of the design;
   visually displaying the documents to a user as a series of visually displayed forms;
   said user adding information to said visually displayed forms to make changes to one or more of the documents, to change the design and the model for the design, including changing a plurality of the properties of the model elements; wherein
   changes to the documents result in both changes to the model and consistent changes across the suite of documents generated from the model, and changing any one of the properties by the user leads to a refreshing of said one property wherever said one property is repeated in all of the documents; and
   restricting the changes the user can make to the forms to prevent the user from making changes across different properties of the model.

2. A method according to claim 1, wherein the model identifies specific relationships between the elements of the model, and each of the model elements has defined properties, and wherein:
   at least some of the documents include first and second types of text;
   the first type of text is retrieved from the properties of the model elements;
   the second type of text is reproduced verbatim from a template; and
   the structure of the documents is derived from the structure of the model.

3. A method according to claim 2, wherein the step of providing information includes the step of the user editing the first type of text in one said document; wherein said editing results in a change to one of the properties of the model elements, and leads to the refreshing of said one property wherever said one property is repeated in all of the documents.

4. A method according to claim 2, wherein the step of providing information includes the step of the user editing the document structure of one of said documents, wherein said editing results in a corresponding change to the model structure, leading to the refreshing of said model structure wherever said model structure appears in all of the documents.

5. A method according to claim 4, further comprising the step of:
   prompting the user to select one of a plurality of possible model change interpretations of the document structure edit.

6. A method according to claim 2, wherein at least one portion of at least one said documents is associated with a pop-up menu that allows elements and relationships of the model to be created and deleted.

7. A method according to claim 2, further comprising the step of: producing a clue book providing a mapping from strings in the displayed documents to objects in the model.

8. A method according to claim 1, further comprising the step of:
generating additional information that is not displayed to the user and that enables changes to the documents to result in corresponding changes to the model.

9. A method according to claim 8, wherein said additional information includes information concerning a portion of the document and includes: an identifier of the model element represented, or a name of a property whose value is represented, or a type of model element to be created when adding another model element, or a type of relationship to create and a model element identifier of a peer model element to relate to when adding another new or existing model element, or an arbitrary command to be offered as an operation in a pop-up menu for that portion of the document.

10. A method according to claim 2, further comprising the steps of:
the user selecting a portion of the document;
opening a graph editor on the portion of the model represented by said selected portion of the document;
the user using the graph editor to make changes to the model; and
the changed model content being refreshed wherever said model content appears in all of the documents.

11. The method according to claim 1, wherein the restricting includes:
showing to the user a list of the types of changes the user can make to the forms; and
restricting the user to changes to the forms of the type on said list; and
restricting the changes the user can make to changes to contiguous characters within a single defined block of text of the model.

12. A system for using visually displayed forms to make changes in a model for a design, said system comprising:
a report generator for generating a suite of documents from a model representing some or all of the design, the design including a multitude of design elements, the model including a multitude of model elements, each of the model elements having defined properties, each of the design elements being represented by a single one of the model elements, and each of the documents describing a different aspect of the design;
a display device for visually displaying the documents to a user as a series of forms; and
user input means to enable the user to add information to said visually displayed forms to make changes to one or more of the documents, to change the design and the model for the design, including changing a plurality of the properties of the model elements; wherein
changes to the documents result in both changes to the model and consistent changes across the suite of documents generated from the model, and changing any one of the properties by the user leads to a refreshing of said one property wherever said one property is repeated in all of the documents; and
the user input means restricts the changes the user can make to the forms to prevent the user from making changes across different properties of the model.

13. A system according to claim 12, wherein the model identifies specific relationships between the elements of the model, and each of the model elements has defined properties, and wherein:
at least some of the documents include first and second types of text;
the first type of text is retrieved from the properties of the model elements;
the second type of text is reproduced verbatim from a template; and
the structure of the documents is derived from the structure of the model.

14. A system according to claim 13, wherein when the user edits the first type of text in one of said documents, said edit results in a change to one of the properties of the model elements, and leads to the refreshing of said one property wherever said one property is repeated in all of the documents.

15. A system according to claim 13, wherein when the user edits the document structure of one of said documents, said edit results in a corresponding change to the model structure, leading to the refreshing of said model structure wherever said model structure appears in all of the documents.

16. A system according to claim 15, further comprising means for prompting the user to select one of a plurality of possible model change interpretations of the document structure edit.

17. A system according to claim 13, further comprising:
a graph editor; and wherein:
when the user selects a portion of the document, said graph editor opens on the portion of the model represented by said selected portion of the document; and
when the user uses the graph editor to make changes to the model, the changed model content is refreshed wherever said model content appears in all of the documents.

18. A computer readable storage media, tangibly embodying a program of instructions executable by the computer to perform method steps for using visually displayed forms to make producing changes in a model for a design, said method steps comprising:
using a model to represent some or all of the design, the design including a multitude of design elements, each of the model elements having defined properties, the model including a multitude of properties and a multitude of model elements, and each of the design elements being represented by a single one of the model elements;
generating a suite of documents from the model, each of the documents describing a different aspect of the design;
visually displaying the documents to a user as a series of visually displayed forms; and
said user adding information to said visually displayed forms to make changes to one or more of the documents, to change the design and the model for the design, including changing a plurality of the properties of the model elements; wherein
changes to the documents result in both changes to the model and consistent changes across the suite of documents generated from the model, and changing any one of the properties by the user leads to a refreshing of said one property wherever said one property is repeated in all of the documents; and
restricting the changes the user can make to the forms to prevent the user from making changes across different properties of the model.

19. A computer readable storage media according to claim 18, the model identifies specific relationships between the elements of the model, and each of the model elements has defined properties, and wherein:

at least some of the documents include first and second types of text;

the first type of text is retrieved from the properties of the model elements;

the second type of text is reproduced verbatim from a template; and the structure of the documents is derived from the structure of the model.

20. A computer readable storage media according to claim 19, wherein the step of providing information includes the step of the user editing the first type of text in one said document; wherein said editing results in a change to one of the properties of the model elements, and leads to the refreshing of said one property wherever said one property is repeated in all of the documents.

* * * * *